May 17, 1949. E. W. KUHN 2,470,625
NO-LOAD TAP CHANGER
Filed Sept. 20, 1947 4 Sheets-Sheet 1

WITNESSES:
E. A. McCloskey.
Nw. C. Groove

INVENTOR
Edmund W. Kuhn.
BY
Franklin E. Hardy
ATTORNEY

May 17, 1949.　　　　　　　　E. W. KUHN　　　　　　　　2,470,625
NO-LOAD TAP CHANGER
Filed Sept. 20, 1947　　　　　　　　　　　　　　　　　　　4 Sheets-Sheet 2

WITNESSES:
E. A. M? Closky
Mrs. L. Goodrick

INVENTOR
Edmund W. Kuhn.
BY
Franklin E. Hardy
ATTORNEY

May 17, 1949.  E. W. KUHN  2,470,625
NO-LOAD TAP CHANGER
Filed Sept. 20, 1947  4 Sheets-Sheet 3

WITNESSES:

INVENTOR
Edmund W. Kuhn.
BY
Franklin E. Hardy
ATTORNEY

May 17, 1949.　　　　　　　　E. W. KUHN　　　　　　　2,470,625
NO-LOAD TAP CHANGER
Filed Sept. 20, 1947　　　　　　　　　　　　　　　　4 Sheets-Sheet 4

WITNESSES:
E. A. M'Closkey
Wm. C. Groove

INVENTOR
Edmund W. Kuhn.
BY
Franklin E. Hardy
ATTORNEY

Patented May 17, 1949

2,470,625

UNITED STATES PATENT OFFICE 2,470,625

NO-LOAD TAP CHANGER

Edmund W. Kuhn, Cortland, Ohio, assignor to Westinghouse Electric Corporation, East Pittsburgh, Pa., a corporation of Pennsylvania Application September 20, 1947, Serial No. 775,319

6 Claims. (Cl. 200—4)

My invention relates to ratio adjustors or tap changers, such as are used in transformers, for changing the ratio between the primary and secondary winding voltages.

Many transformers are operated under conditions which require that the voltage ratio between the primary and secondary windings be adjusted at intervals. This may be done by providing one of the transformer windings with a plurality of tap connections connected between suitable tap points on the winding and switch contact members so that by operation of a tap changer switch a selected number of turns of the winding may be excluded from or included in the winding circuit, as desired, thus varying the effective number of turns in the winding.

More particularly, my invention relates to a tap changer switch for changing the transformer voltage ratio in a plurality of steps, together with switch operating means therefor. The invention is illustrated with the tap changer switch and operating mechanism therefor positioned within a transformer casing with the operating handle extending through the casing wall so that it may be operated from outside the casing.

Conventional no-load tap changers have been provided in which a series of stationary contact members are positioned along the arc of a circle and so arranged that a movable contact member having a rotary motion is so positioned as to slide along or wipe over the ends of the stationary contact members to bridge any two adjacent stationary contact members to obtain the desired voltage. In this construction the degree of rotation of movement of the movable contact member for each tap change is dependent on the number of winding taps, that is, the number of stationary contact members which must be selectively engaged by the movable contact members. In most cases the amount of rotation from one tap position to another is small. Consequently, to obtain the accuracy necessary to ensure sufficient contact area between the movable and stationary contact members to obtain good current carrying characteristics of the switch extremely precise assembly of the parts of the switch structure is required with relatively high costs.

In accordance with my invention the objections to the use of a rotary member directly sliding or wiping across the contact faces of the stationary contact members is avoided, and a bridging contact member is moved from one tap position to another by being first raised from engagement with one pair of stationary contact members, then rotated to a position above the next pair of contact members, and then lowered into engagement to bridge the desired pair of stationary contact members. The desired contact pressure is effected by means of an intermittent gearing for operating the tap switch which includes an operating cam and a spring member associated with the bridging contact.

It is an object of my invention to provide a tap changing mechanism of the above indicated character in which means is provided for operating the switch from one tap position to another by first raising a movable bridging contact member from engagement with a pair of stationary switch contact members, then moving the bridging contact member from a position opposite the pair of stationary contact members to a position opposite the next pair of stationary contact members in the sequence of operation of the switch, and then bringing the bridging contact member into circuit closing engagement with that pair of the switch contact members.

Other objects and advantages of the invention will be apparent from the following description of certain preferred embodiments of the invention, reference being had to the accompanying drawings, in which.

Figure 1:
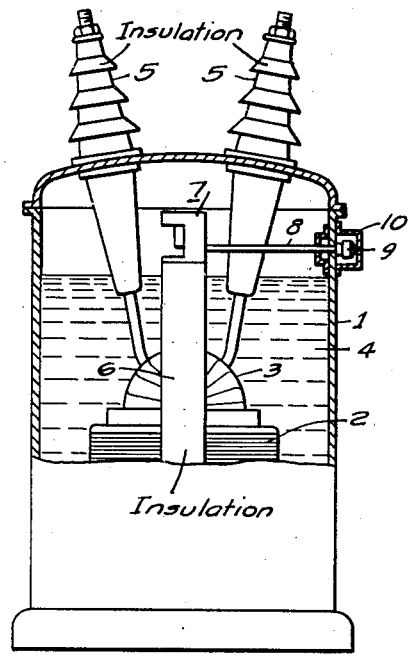
Figure 1 is a side elevational view of an oil immersed transformer, partly in section, provided with a tap changer switch constructed in accordance with my invention.

Referring to the drawings and particularly to Fig. 1 thereof, a transformer casing 1 is provided enclosing a transformer structure comprising the core 2 and windings 3 immersed in a cooling and insulating fluid, such as oil 4. The winding terminals extend through conventional terminal bushings 5 in a well-known manner. The tap changer switch is mounted in a cylindrical tube 6 of insulating material at the upper end of which is positioned an operating mechanism 7 from which extends an operating shaft 8, operatively connected to an operating handle 9 positioned outside of the casing 1, which may be covered by a protecting shield 10. The operating handle may be a crank operable through a complete circle for each operation of the mechanism, and may be provided with latching means for retaining it in the desired position between operations, and with an indicator to show the tap position of the switch.

Figure 2:
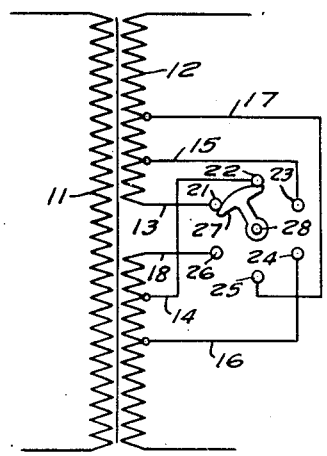
Fig. 2 is a diagrammatical view showing the tap connections between the tap changer switch and the transformer winding.

Referring to Fig. 2, primary and secondary windings 11 and 12, respectively, of a transformer are illustrated. From selected tap points of the winding 12 tap conductors 13, 14, 15, 16, 17 and 18 are connected to stationary switch contact members 21, 22, 23, 24, 25 and 26 respectively. A movable bridging contact member 27 that is capable of bridging any two adjacent stationary contact members is provided and is operatively connected to a shaft 28.

Figure 7:
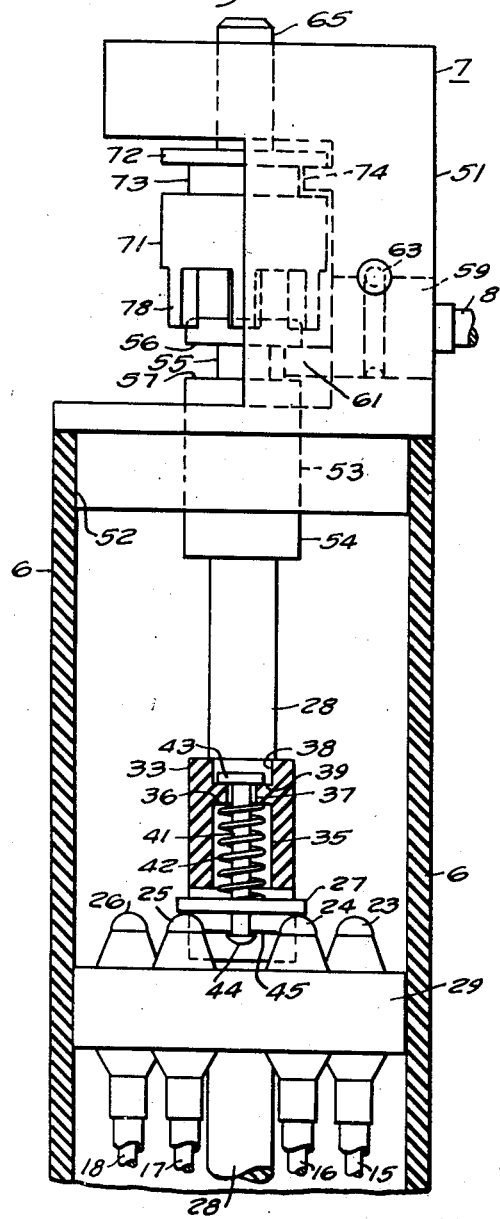
Fig. 7 is a side elevational view of the tap switch assembly with the switch in a circuit closing position, certain parts being shown in section.
Figure 8:
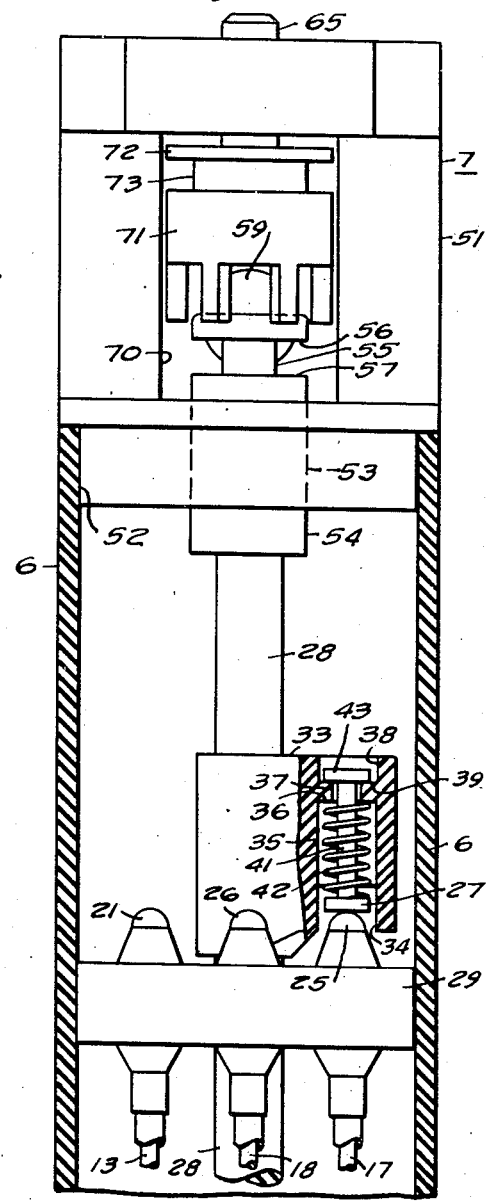
Fig. 8 is a side elevational view of the tap changer switch assembly taken at right angles to the view shown in Fig. 7 and with parts shown in section.
Figure 9:
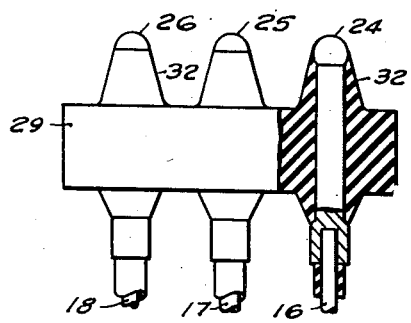
Fig. 9 is an elevational view, partly in section, illustrating the terminal board and stationary contact members.
Figure 10:
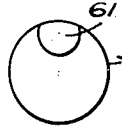
Fig. 10 is an inner end view of the driving gear of the operating mechanism.
Figure 11:
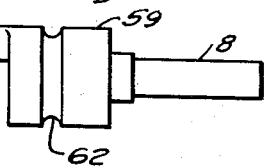
Fig. 11 is a side elevational view of the driving gear.
Figure 12:
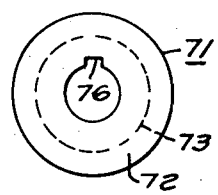
Fig. 12 is a top plan view of the driven gear of the operating mechanism.
Figure 13:
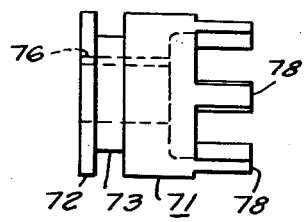
Fig. 13 is a side elevational view of the driven gear.
Figure 14:
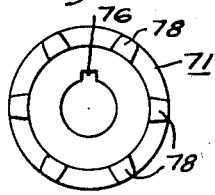
Fig. 14 is a bottom plan view of the driven gear.
Figure 15:
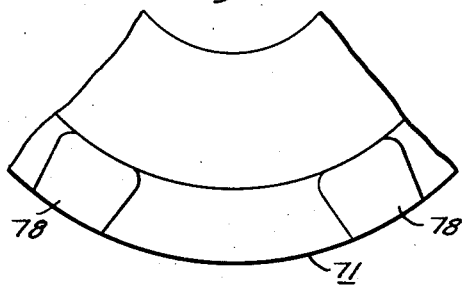
Fig. 15 is an enlarged bottom plan view of a portion of the driven gear.

The physical relation between the movable bridging contact member 27 and the stationary shown in Figs. 4, 5, 6, 7, 8 and 9. The stationary contact members 21 to 26, inclusive, is best shown in Figs. 4, 5, 6, 7, 8 and 9. The stationary contact members 21 to 26, inclusive, are mounted in an insulating terminal board 29 positioned within the insulating tube 6. As best shown in Fig. 9, the stationary contact members 24, 25, 26, etc., are in the form of studs of conducting material extending through a terminal board 29 of insulating material which may be moulded about the stationary contact members and provided with upwardly extending conical surfaces 32. The upper ends of the studs comprising the contact surfaces thereof, may be substantially spherical in shape. The upper ends of the contact members are positioned at an appreciable distance above the upper side of the terminal board, and the lower ends of the stationary contact members or studs project below the terminal board and are shown connected to the appropriate tap connecting conductor, such as 16, 17 and 18.

As shown in Figs. 5, 6, 7 and 8, the shaft 28 extends through a central opening in the terminal board 29. In the drawing a single tap changing switch is shown operated by the shaft 28. It will be appreciated that the shaft 28 may be arranged to operate three similar tap changing switches positioned at different elevations within the tube 6 and associated with the separate phases of three-phase transformer. Since the structure and operation of each phase switch is identical to the others, the description of a single switch is sufficient to understand the invention.

Referring particularly to Figs. 7 and 8, it will be noted that the bridging contact member 27 is supported within a recess on a contact carrying arm 33 of insulating material that is mounted on the shaft 28 and arranged to move both longitudinally and rotatively with the movements of the shaft 28. An outer lip 34 extends downwardly from the outer side of the contact carrying arm 33 for aiding in guiding the movement of the bridging contact member 27. A bore 35 extends upwardly into the contact arm 33 terminating in an abutment 36 centrally of which a smaller bore 37 extends upwardly and again widens into a wider bore 38 having a lower abutment 39. The bridging contact member 27 is mounted on the lower end of a pin 41 extending upwardly within a spiral spring 42, the one end of which terminates against the abutment 36 and the lower end of which engages the bridging contact member 27. The upper end of the pin 41 extends through the small bore 37 and terminates in an enlarged head 43 which rests against the abutment 36 to limit the movement of the pin 41 downwardly. As best shown in Fig. 7, the pin 41 extends downwardly through an opening in the bridging contact member 27 and is provided at its lower end with an enlarged portion 44 providing a flange 45 that is adapted to engage the lower side of the bridging contact member 27 to move it upwardly from engagement with the fixed contact members when the shaft 28 is moved upwardly. When the shaft 28 and the bridging contact member 27 are in their lower or circuit closing positions the bridging contact member 27 is appreciably above the lower end of the lip 34, as best shown in Fig. 8, and the spring 42 is under compression, thus applying a contact pressure between the bridging contact member 27 and the fixed contact members engaged by it. In this position of the switch mechanism, the enlarged head 44 is appreciably below the lower surface of the bridging contact member 27. When the shaft 28 is moved upwardly carrying the contact carrying arm 33 with it, the lower end of the pin 41 is carried upwardly through the opening in the bridging member 27 until the flange 45 engages the underside of the bridging contact member and upon further upward movement of the shaft 28 and contact carrying arm 33, the bridging contact member 27 moves upwardly or to the position shown in Figs. 5 and 6, out of engagement with the fixed contact members that are mounted in the terminal board 29.

Figure 3:
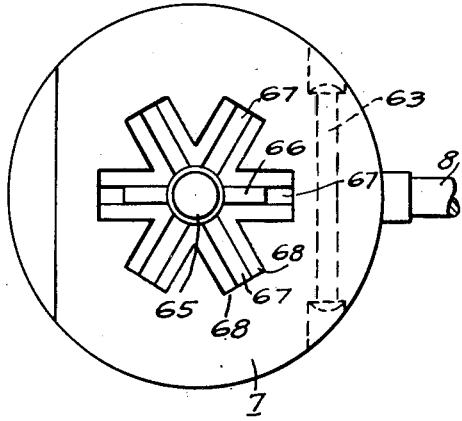
Fig. 3 is a top plan view of the tap changer switch operating assembly.
Figure 4:
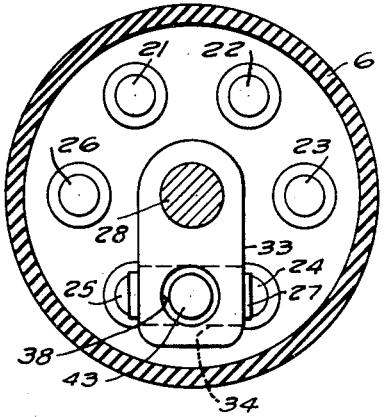
Fig. 4 is a plan view of the switch mechanism, parts being shown in section taken along the line IV—IV in Fig. 5.
Figure 5:
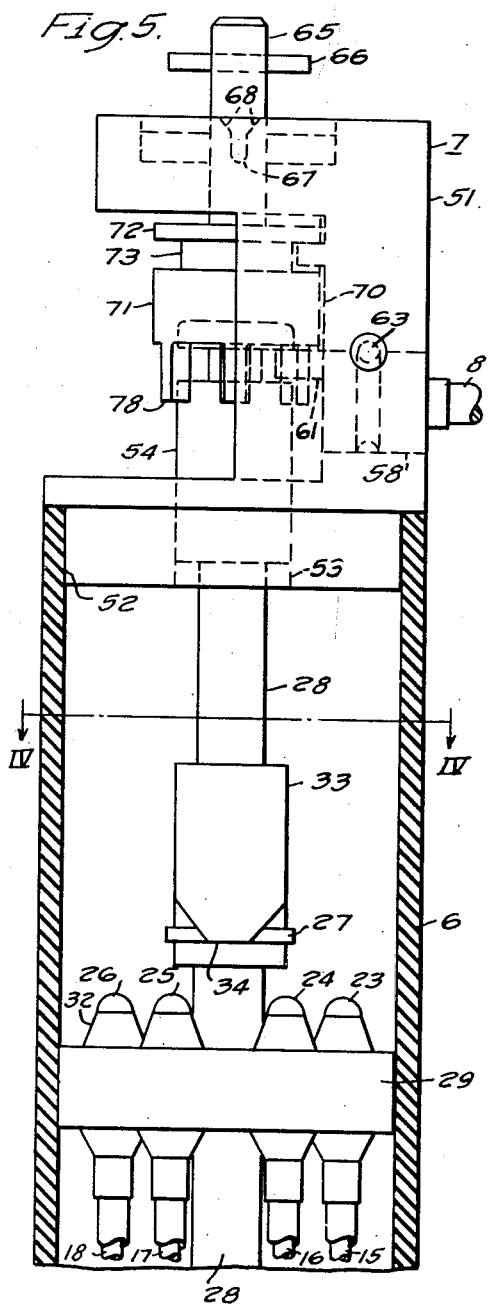
Fig. 5 is a side elevational view of the tap switch assembly with the switch in an open circuit position with parts shown in section.
Figure 6:
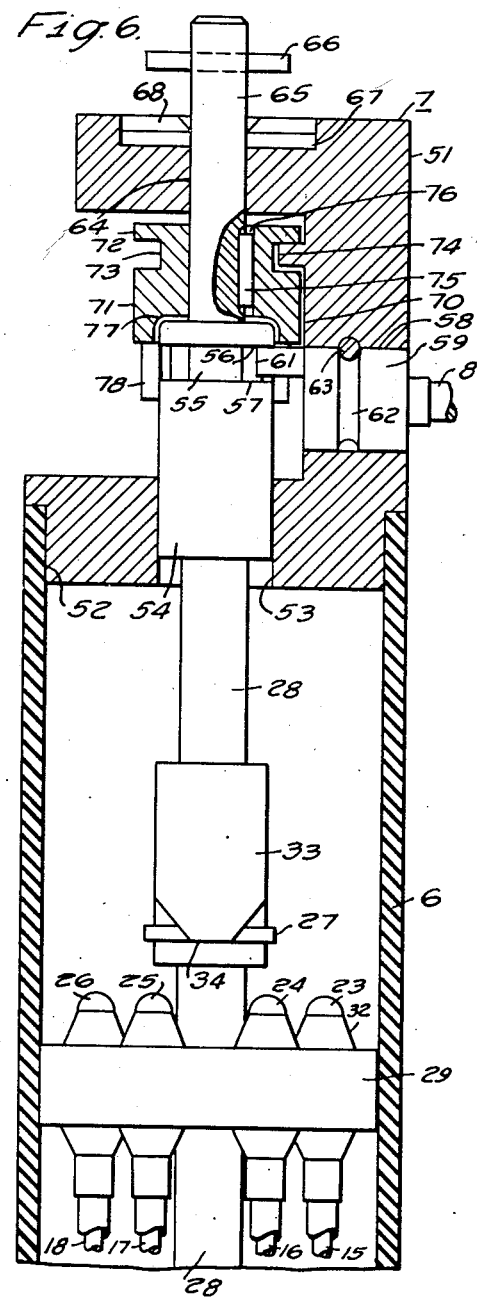
Fig. 6 is a side elevational view of the tap changer switch assembly with parts associated with the operating mechanism shown in section.

Referring to Figs. 5, 6, 7 and 8, the operating mechanism 7 includes a housing 51 that is mounted on the upper end of the insulating tube 6 and is shown as extending along the surface 52 to fit within the upper end of the tube 6. A bore 53 extends upwardly through the lower portion of the housing 51 to accommodate a follower shaft 54 that is attached to the upper end of the main shaft 28 and operates with the shaft 28. The follower shaft 54 and the shaft 28 may be a unitary structure but for convenience in manufacturing, are shown as two separate parts. However, in operation they operate as a single shaft. The follower shaft 54 is provided with a groove 55 providing an upper abutment surface 56 and a lower abutment surface 57. A bore 58 is provided in the side wall of the housing 51 in which is positioned a driving gear or cam 59 having a tooth 61 that is positioned between the abutment surfaces 56 and 57 to raise and lower the follower shaft 54 and the main shaft 28 upon rotation of the driving gear 59 in a manner to be later described. The shaft 8 is operatively connected to the gear 59. A groove 62 is provided centrally of the driving gear 59 and accommodates a screw 63 that is driven through the wall of the housing 51 to prevent movement of the driving gear 59 longitudinally while permitting it to freely rotate. A bore 64 is provided in the upper portion of the housing 51 to accommodate the upper end 65 of the follower shaft which is shown as having a smaller diameter than the lower portion thereof sliding within the bore 53. A pin 66 extends through the upper end 65 of the follower shaft and is positioned at such an elevation as to fit within one of a plurality of slots 67 in the upper surface of the housing 51 when the shaft 28 and the bridging member 27 are in their lower or circuit closing positions. The pattern of the several radial slots 67 is best shown in Fig. 3 and corresponds to the number of tap step positions of the switch. Extending upwardly from the slots 67, bevel or slant portions 68 are provided to guide the pin 66 in its downward movement into the slot 67 to properly position the bridging member 27 with respect to the fixed contact members mounted on the terminal board 29, and to prevent rotation of the shaft 28 and the bridging member 27 while the bridging member 27 is in its lower or circuit closing position.

A driven gear 71 is provided within a semi-cylindrical recess 70 in the housing 51 and positioned about the upper portion 65 of the follower shaft having a smaller diameter than the lower portion thereof. The driven gear 71 is provided with an upper flange 72 at its upper end below which is a circumferential groove 73 for accommodating a projection 74 extending from the housing 51 to limit the vertical movement of the driven gear 71. A key 75 is positioned in a groove in the shaft 65 and arranged for slidably entering a groove 76 extending vertically through the gear 71 so that the gear 71 will rotate with the shaft 54 while permitting free vertical movement of the shaft with respect to the gear. A recess 77 is provided in the lower part of the gear 71 for accommodating the upper end of the enlarged portion of the follower shaft 54, and the gear 71 is provided with downwardly extending gear teeth 78 corresponding in number to the number of tap positions of the switch and spaced sufficiently to receive the tooth 61 of the driving gear 59.

When the bridging member 27 of the tap changing switch is in its lower or circuit closing position as shown in Fig. 7, the driving gear or cam 59 is in such a position that the tooth 61 is in the lowest position of its travel, as shown in dotted lines in Fig. 7. The tap changing switch is operated from one tap switch position to the next tap step position by operating the shaft 8 and the driving gear 59 through one revolution. During the first portion of this revolution, approximately a quarter thereof, the tooth 61 which is positioned between the surfaces 56 and 57 in the follower shaft 54 raises the shaft 54, together with the main shaft 28 and the contact carrying arm 33, sufficiently to separate the bridging contact member 27 from the pair of stationary contact members engaged by it. This brings the tooth 61 of the driving gear between a pair of downwardly extending teeth 78 on the driven gear 71 so that, as the tooth 61 continues to move through the upper portion of its travel, the driven gear 71, together with the shaft 28, and the bridging contact member 27, are rotated to the next tap step position positioning the bridging contact member 27 over the pair of stationary contact members in the terminal board 29 which are to be bridged by the contact member 27 upon completion of the tap changing operation. During the latter part of the complete revolution, the tooth 61 in its downward movement is moved below the lower ends of the teeth 78 in the driven gear 71 while at the same time causing the shaft 28 and the bridging contact member 27 to move downwardly as previously described, bringing the bridging contact member 27 under the compression of the spring 42 to close the switch in its next tap position.

During the first portion of the revolution of the driving gear 59, the pin 66 extending through the upper end 65 of the shaft moves upwardly with the shaft from the slot 67. During this portion of the movement of the shaft, the bridging contact member 27 moves vertically away from engagement with the pair of fixed contact members bridged by it. When the pin 66 is moved above the upper surface of the housing 51, it no longer prevents rotation of the shafts 28 and 54 but permits them to be freely rotated by the driven gear 71 as above described. When the shaft is again moved downwardly, corresponding to the latter part of the revolution of the driving gear 59, the pin 66 likewise moves downwardly into the next adjacent slot, following the pattern shown in Fig. 3 which corresponds also to the pattern of switch positions shown in Fig. 4.

It will be apparent from the above description of my invention that, as the tap changer switch moves from one tap position to another, the contact pressure existing between the bridging contact member 27 and the associated pair of stationary contact members 21 to 26 is first released without any rotative motion of the bridging contact member 27, and that the bridging contact member is moved directly away from engagement with the fixed contact members before the bridging contact member is rotated to the new tap step position, and that after this rotation is completed, it is again moved downwardly into full contact pressure with the stationary contact members to be bridged thereby in the new tap position.

It will be apparent to those skilled in the art that modifications may be made in the structure illustrated and described without departing from the spirit of my invention, and I do not wish to be limited otherwise than by the scope of the appended claims.

I claim as my invention:

1. A tap changer for transformers comprising an insulating tube, a horizontally disposed terminal board of insulating material within the tube, a plurality of stationary contact members mounted on and extending upwardly from said terminal board and arranged substantially in the arc of a circle, a shaft extending vertically upwardly centrally of the circle of said contact members, a contact arm carried by and offset from said shaft and a bridging contact member mounted on said contact arm and adapted to engage a pair of said stationary contact members, an operating mechanism mounted at the upper end of said tube and comprising a housing, a follower shaft within the housing connected to said first named shaft, a driven gear keyed to rotate with said follower shaft and having a plurality of downwardly extending teeth, a driving gear comprising a cylindrical body portion positioned with its axis at right angles to the axis of the shaft and having a single tooth movable eccentric of the axis and continuously engaging the follower shaft to raise and lower the shaft, the tooth of said pinion gear being so arranged as to engage between two adjacent teeth on said driven gear for rotating the shaft a predetermined amount corresponding to the arc between successive switch positions while the shaft is in its upper or circuit open position, said gears being operable during each rotation of the driving gear to raise the shaft to a switch interrupting position, rotate the shaft to the next step position of the switch, and to lower the shaft to a switch closing position.

2. A tap changer for transformers comprising an insulating tube, a horizontally disposed terminal board of insulating material within the tube, a plurality of stationary contact members mounted on and extending upwardly from said terminal board and arranged substantially in the arc of a circle, a shaft extending vertically upwardly centrally of the circle of said contact members, a contact arm carried by and offset from said shaft and a bridging contact member mounted on said contact arm and adapted to engage a pair of said stationary contact members, an operating mechanism mounted at the upper end of said tube and comprising a housing, a follower shaft within the housing connected to said first named shaft, a driven gear keyed to rotate with said follower shaft and having a plurality of downwardly extending teeth, a driving gear comprising a cylindrical body portion positioned with its axis at right angles to the axis of the shaft and having a single tooth movable eccentric of the axis and continuously engaging the follower shaft to raise and lower the shaft, the tooth of said pinion gear being so arranged as to engage two adjacent teeth on said driven gear for rotating the shaft a predetermined amount corresponding to the arc between successive switch positions while the shaft is in its upper or circuit open position, said gears being operable during each rotation of the driving gear to raise the shaft to a switch interrupting position, rotate the shaft to the next step position of the switch, and to lower the shaft to a switch closing position, the upper end of said follower shaft extending upwardly through the upper end of the housing, the housing having a plurality of slots in its upper surface extending radially from the shaft in directions corresponding to the several circuit closing positions of the switch, a guide pin extending through the upper end of said follower shaft and positioned in one of said slots when the shaft is in its lower or circuit closing position to prevent rotation of the shaft.

3. A tap changer for transformers including a rotary switch comprising a plurality of stationary contact members arranged in the arc of a circle about a common vertical axis, said contact members having their contact surfaces in a substantially single plane perpendicular to said axis, a shaft extending along the axis of the circle, a contact arm carried by said shaft and a bridging contact member carried on the lower end of the contact arm and offset from the shaft and adapted to engage an adjacent pair of said stationary contact members, biasing means associated with said bridging contact member for biasing it downwardly when in a circuit closing position, said shaft and bridging contact member being operable downwardly to a switch closing tap position when the shaft is rotatively positioned in one of a plurality of tap step positions, guide means for locking the shaft against rotation when in a switch closing tap position, and for permitting rotation of the shaft from one tap step position to another tap step position when said bridging contact is raised from a switch closing tap position, and switch operating means including gear mechanism for operating said shaft and bridging contact member upwardly to raise the shaft and bridging contact member from a switch closing tap position and unlock the shaft to permit rotation thereof, to then rotate the shaft and bridging contact member to the next adjacent switch position, and to then lower the shaft and bridging contact member to the next switch closing tap position.

4. A tap changer for transformers including a rotary switch comprising a plurality of stationary contact members arranged in the arc of a circle about a common vertical axis, said contact members having their contact surfaces in a substantially single plane perpendicular to said axis, a shaft extending along the axis of the circle, a contact arm carried by said shaft and a bridging contact member carried on the lower end of the contact arm and offset from the shaft and adapted to engage an adjacent pair of said stationary contact members, biasing means associated with said bridging contact member for biasing it downwardly when in a circuit closing position, said shaft and bridging contact member being operable downwardly to a switch closing tap position when the shaft is rotatively positioned in one of a plurality of tap step positions, guide means for locking the shaft against rotation when in a switch closing tap position, and for permitting rotation of the shaft from one tap step position to another tap step position when said bridging contact is raised from a switch closing tap position, switch operating mechanism including a driven gear rotatable with said shaft and having a plurality of gear teeth corresponding in number to the number of tap step positions, and a driving gear having a single tooth for meshing with said driven gear to rotate the shaft from one tap step position to another tap step position during one revolution of said driving gear, said switch operating mechanism being operated upon the first portion of a revolution of said driving gear for raising said shaft and the bridging contact from engagement with the stationary contact members corresponding to one tap step position of the switch, said driving and driven gears being operatively engaged during another portion of a revolution of said driving gear for rotating said shaft to another tap step position, said switch operating mechanism being operative upon the last portion of the revolution of said driving gear for lowering said shaft and the bridging contact into engagement with the stationary contact members corresponding to said other tap step positions.

5. A tap changer for transformers including a rotary switch comprising a plurality of stationary contact members arranged in the arc of a circle about a common vertical axis, said contact members having their contact surfaces in a substantially single plane perpendicular to said axis, a shaft extending along the axis of the circle, a contact arm carried by said shaft and a bridging contact member carried on the lower end of the contact arm and offset from the shaft and adapted to engage an adjacent pair of said stationary contact members, biasing means associated with said bridging contact member for biasing it downwardly when in a circuit closing position, said shaft and bridging contact member being operable downwardly to a switch closing tap position when the shaft is rotatively positioned in one of a plurality of tap step positions, guide means for locking the shaft against rotation when in a switch closing tap position, and for permitting rotation of the shaft from one tap step position to another tap step position when said bridging contact is raised from a switch closing tap position, switch operating mechanism including a driven gear having its axis coincident with the axis of the shaft and having gear teeth corresponding in number to the number of the tap step positions, the teeth being parallel to the axis of the gear, and a driven gear having an axis at right angles to the axis of the driven gear and a single tooth parallel to the axis of the driven gear and rotatable about that axis, the shaft having a slot for receiving the tooth of the driven gear throughout the entire revolution of the gear effective for raising the shaft and the bridging contact carried thereby to effect separation of the bridging contact from the stationary contact members corresponding to one tap step position of the switch during upward movement of the gear tooth and for lowering the shaft and bridging contact member to engage stationary contact members corresponding to a tap step position of the switch during downward movement of the gear tooth, the gear tooth being effective, during a portion of its revolution, while the bridging contact member is in its raised position to engage between the teeth of the driven gear to rotate the shaft and bridging contact member from one tap step position to another.

6. A tap changer for transformers including a rotary switch comprising a plurality of stationary contact members arranged in the arc of a circle about a common vertical axis, said contact members having their contact surfaces in a substantially single plane perpendicular to said axis, a shaft extending along the axis of the circle, a contact arm carried by said shaft and a bridging contact member carried on the lower end of the contact arm and offset from the shaft and adapted to engage an adjacent pair of said stationary contact members, biasing means associated with said bridging contact member for biasing it downwardly when in a circuit closing position, said shaft and bridging contact member being operable downwardly to a switch closing tap position when the shaft is rotatively positioned in one of a plurality of tap step positions, guide means for locking the shaft against rotation when in a switch closing tap position, and for permitting rotation of the shaft from one tap step position to another tap step position when said bridging contact is raised from a switch closing tap position, switch operating mechanism including a driven gear having its axis coincident with the axis of the shaft and having gear teeth corresponding in number to the number of the tap step position, the teeth being parallel to the axis of the gear, and a driven gear having an axis at right angles to the axis of the driven gear and a single tooth, parallel to the axis of the driven gear and rotatable about that axis, the shaft having a slot for receiving the tooth of the driven gear throughout the entire revolution of the gear effective for raising the shaft and the bridging contact carried thereby to effect separation of the bridging contact from the stationary contact members corresponding to one tap step position of the switch during upward movement of the gear tooth and for lowering the shaft and bridging contact member to engage stationary contact members corresponding to a tap step position of the switch during downward movement of the gear tooth, the gear tooth being effective, during a portion of its revolution, while the bridging contact member is in its raised position to engage between the teeth of the driven gear to rotate the shaft and bridging contact member from one tap step position to another, a housing associated with said shaft and having a plurality of slots extending radially from the shaft in directions corresponding to the several tap step positions of the switch, a guide pin extending through the shaft and positioned in one of said slots when the shaft is in its lower or circuit closing position to prevent rotation of the shaft, the guide pin and slots, being so arranged that the pin is raised from the slot to allow rotation of the shaft prior to a sufficient, upward movement of the single tooth of the driving gear to engage the teeth of the driven gear.

EDMUND W. KUHN.

REFERENCES CITED

The following references are of record in the file of this patent:

UNITED STATES PATENTS

| Number | Name | Date |
| --- | --- | --- |
| 1,100,949 | Briggs | June 23, 1914 |
| 1,475,549 | Jacobs | Nov. 27, 1923 |
| 1,678,129 | Tuttle | July 24, 1928 |